(12) United States Patent  
Charron

(10) Patent No.: US 6,659,397 B1
(45) Date of Patent: Dec. 9, 2003

(54) CONTROL SYSTEM FOR ORNITHOPTER

(76) Inventor: Richard Charron, 4529 Willow Pond Ct., E, West Palm Beach, FL (US) 33417

( * ) Notice: Subject to any disclaimer, the term of this patent is extended or adjusted under 35 U.S.C. 154(b) by 0 days.

(21) Appl. No.: 10/273,692

(22) Filed: Oct. 18, 2002

(51) Int. Cl.$^7$ .............................................. B64C 33/02
(52) U.S. Cl. ..................... 244/72; 244/75 R; 244/76 R; 244/195
(58) Field of Search ............................ 244/11, 22, 72, 244/75 R, 75 A, 76 R, 76 C, 194, 195, 120, 17.27

(56) References Cited

U.S. PATENT DOCUMENTS

| | | | | |
|---|---|---|---|---|
| 1,109,891 A | * | 9/1914 | Young | 244/124 |
| 1,177,545 A | * | 3/1916 | Smith | 244/75 R |
| 2,487,646 A | * | 11/1949 | Gluhareff | 244/120 |
| 2,535,164 A | * | 12/1950 | Seibel | 244/120 |
| 2,832,551 A | * | 4/1958 | Gile | 244/75 R |
| 4,155,195 A | | 5/1979 | Leigh-Hunt | |
| 4,706,902 A | * | 11/1987 | Destuynder et al. | 244/195 |
| 5,072,893 A | * | 12/1991 | Chakravarty et al. | 244/76 R |
| 5,669,582 A | * | 9/1997 | Bryant et al. | 244/195 |
| 6,082,671 A | | 7/2000 | Michelson | |
| 6,206,324 B1 | | 3/2001 | Smith | |

\* cited by examiner

Primary Examiner—Galen L. Barefoot
(74) Attorney, Agent, or Firm—McHale & Slavin, P.A.

(57) ABSTRACT

An ornithopter with two set of opposed wings maintains powered flight by flapping each set of wings. To dampen vibration, each set of wings move 180 degrees out of phase. To further dampen vibration, the empennage and cockpit are articulated to move vertically in response to the movement of the wings. Changes of flight direction result from wing warping and changing the center of gravity of the ornithopter.

15 Claims, 5 Drawing Sheets

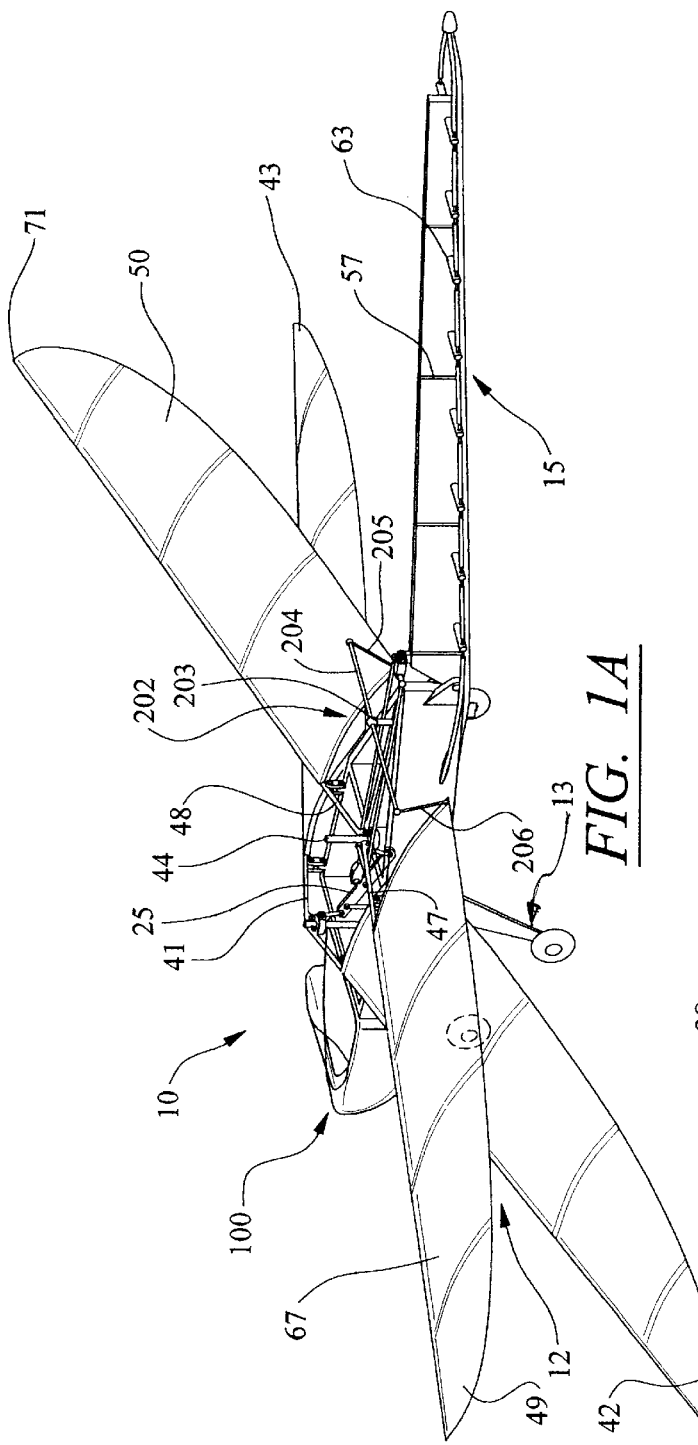
FIG. 1A
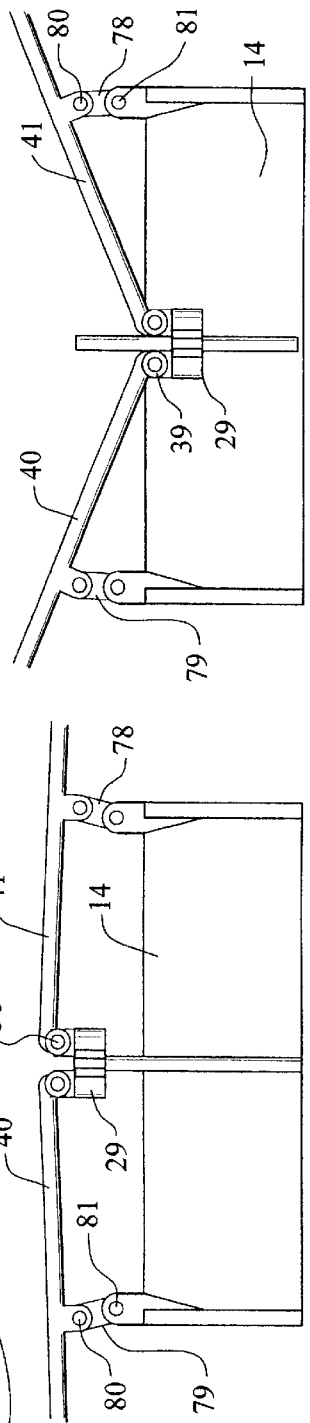
FIG. 1B
FIG. 1C

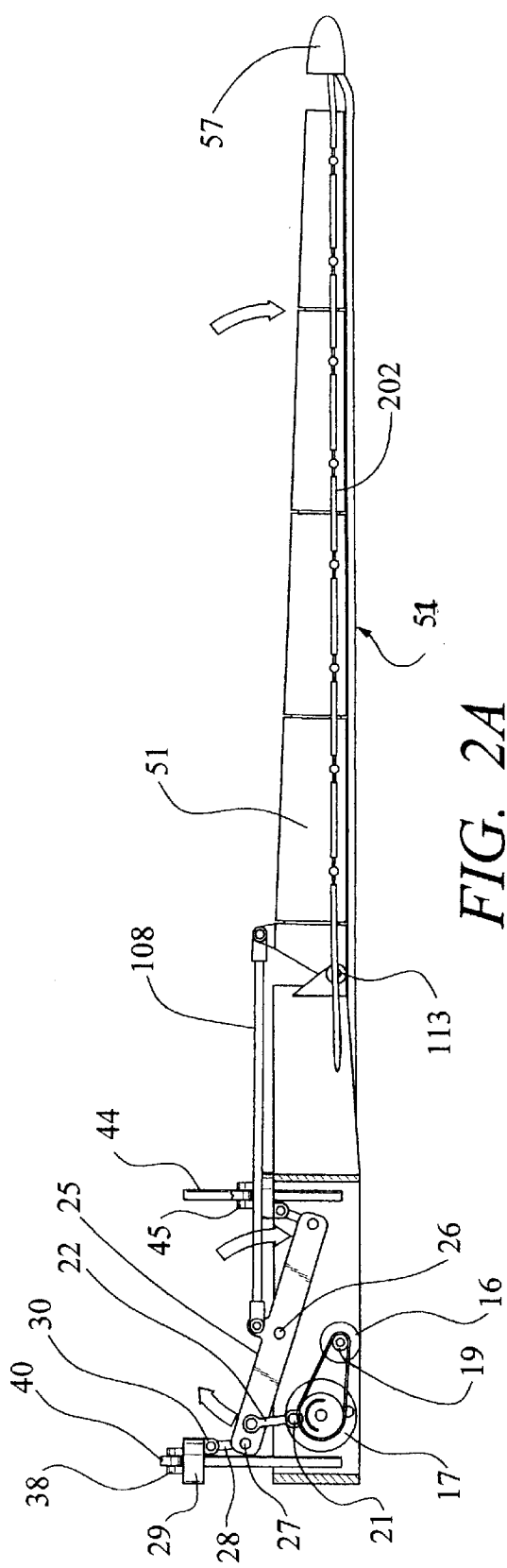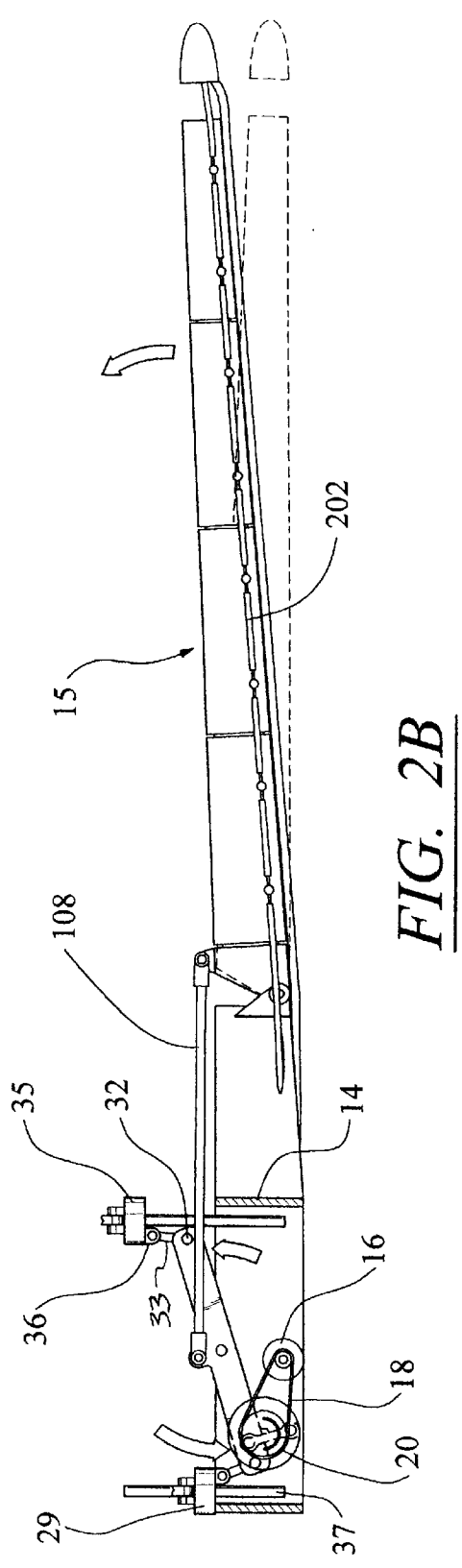
FIG. 2A
FIG. 2B

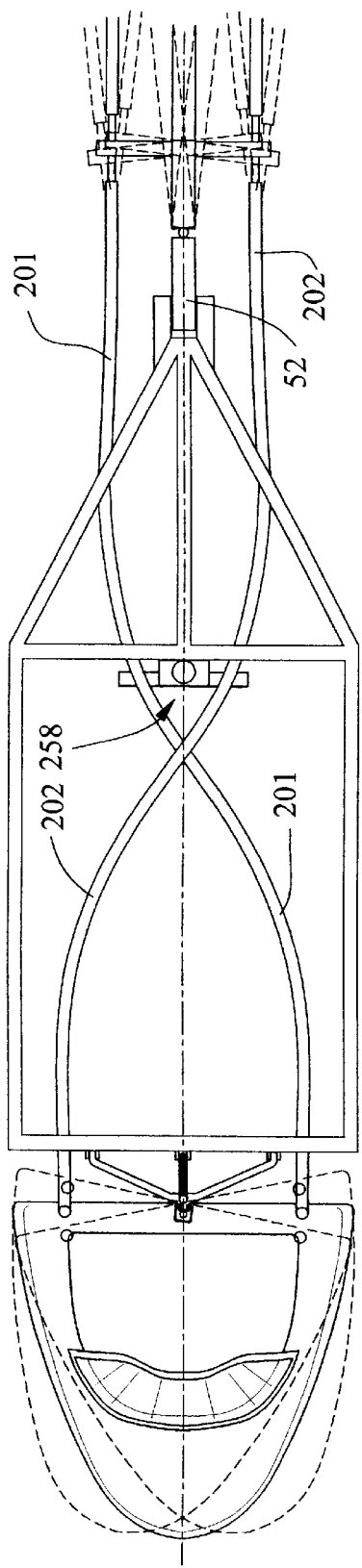
FIG. 5
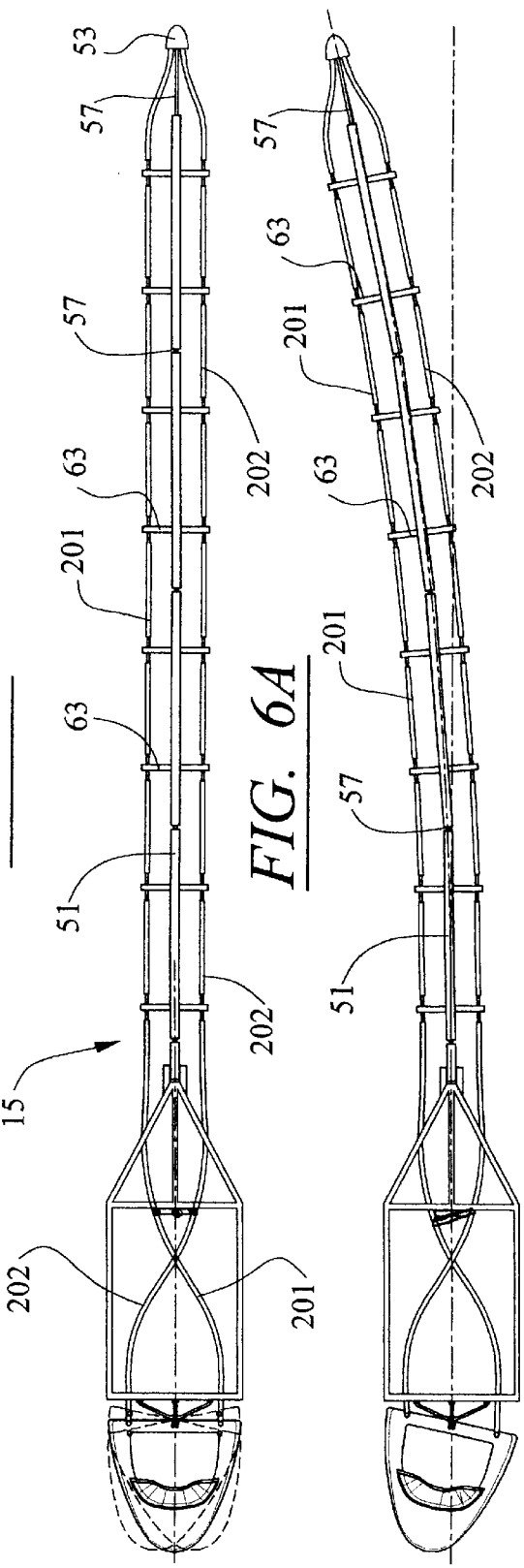
FIG. 6A
FIG. 6B

CONTROL SYSTEM FOR ORNITHOPTER

RELATED APPLICATIONS

This application is related to U.S. patent application Ser. No. 10/164,751 and Ser. No. 10/172,413 both of which are incorporated herein by reference.

FIELD OF THE INVENTION

This invention relates to the field of ornithopters which develop lift and thrust through vertical movement of the wings to develop high aerodynamic propulsive efficiency. Further, the invention includes provision for damping the vibration resulting from movement of the wings.

1. Background of the Invention

There is a long history of aerial vehicles which attain flight through the movement of the wings. Of course, the most successful derivation of this concept is the helicopter. Modern helicopters and conventional aircraft have comparable characteristics of speed, lifting capacity and passenger comfort. These characteristics of the helicopter result from the rotary wing design wherein the wings or blades rotate in a plane parallel with the longitudinal axis of the fuselage.

In attaining the level of performance of current models, the helicopter has become a very complex machine requiring highly trained pilots. One of the most notable features of the helicopter is the balancing of dynamic rotational forces to attain controllable flight. The torque generated by the rotary wing acting against the fuselage must be managed by the pilot to attain straight and level flight. In addition, the pilot must simultaneously manipulate other flight controls similar to an airplane. Further, if the helicopter loses the function of the vertical tail rotor or ducted fan, which provides critical anti-rotational force, controlled flight is impossible.

Ornithopters also use a wing drive for flight. In contrast to the rotary wing of the helicopter, the ornithopter has reciprocating wings which move in a plane normal to the longitudinal axis of the fuselage. The ornithopter eliminates the complexity required for overcoming dynamic rotational forces of flight at the expense of flight speed and incidence of reciprocal vibration. However, the lifting capacity of the ornithopter can be substantial and flight operation is less complex than a helicopter.

Because of the reciprocating movement of the wings, ornithopters suffer from harmonic vibration. The power input and resulting differential moments result in vibratory accelerations in the vertical plane. These vibrations are translated to the fuselage and payload unless damped out or reduced in some manner.

Ornithopters can be useful in specialized tasks requiring slow moving observation or lifting or remote flight found in construction, forestry, oil and gas industry, and the military.

2. Description of the Prior Art

U.S. Pat. No. 6,206,324 to Smith discloses an ornithopter with multiple sets of computer controlled wings which may be programmed to reciprocate in various combinations. The angle of attack of the wings is controlled throughout each reciprocation to provide optimal lift and minimal drag.

The Michelson patent, U.S. Pat. No. 6,082,671, is an attempt to teach the concept of a mechanical insect. The wings are twisted, to optimize lift, during reciprocation by rotation of the wing spar.

A toy ornithopter is disclosed in U.S. Pat. No. 4,155,195. The two sets of wings of the device are mounted on the fuselage in a vertically overlapping design. The sets of wings are reciprocated by crank arms oriented at 90 degrees to each other and powered by a rubber band. The sets of wings reciprocate out of phase with each other in that as one set moves downwardly the other set is moving upwardly. The flight path is preset by adjusting the empennage before flight.

What the prior art lacks is an ornithopter with a simple system for damping vibrations resulting from power inputs.

SUMMARY OF THE INVENTION

Accordingly, it is an objective of the instant invention to teach an ornithopter having vertically moving wings for developing lift and thrust and a movable tail for directional control.

It is a further objective of the instant invention to teach the use of a vibration damping system to reduce vibration in the fuselage and cockpit or load carrying compartment.

It is yet another objective of the instant invention to teach damping vertical vibration by counterbalancing the forces generated by the wings by a fully articulating empennage.

It is a still further objective of the invention to teach the vibratory isolation of the payload compartment from the wing section.

It is another objective to teach the controllability of the vehicle at slow speeds, well below stall speed of fixed wing aircraft and below the speed at which a conventional empennage is effective, by moving the center of gravity in flight.

It is another objective of the invention to teach that the force required to support the lift of the front set of wings is counterbalanced by the force of the aft set of wings and directional control is affected by controlling the shape and angle of attack of the wings.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 1A is a perspective of the ornithopter of this invention;

FIG. 1B is a front view of the wing spars and stationary shaft with the wing at the lower limit of the stroke;

FIG. 1C is a front view of FIG. 1B with the wing at the upper limit of the stroke;

FIG. 2A is a side view, partly in section, of the power train and articulating empennage in downward damping movement;

FIG. 2B is a side view of FIG. 2A showing upward damping of the articulating empennage;

FIG. 5 is a top plan view of FIG. 4 showing lateral movement of the cockpit and empennage in phantom lines;

FIG. 6A is a top plan view of the ornithopter showing lateral movement of the cockpit for flight control;

FIG. 6B is a top plan view of the ornithopter showing coordinated movement of the cockpit and empennage for flight control.

DETAILED DESCRIPTION OF THE INVENTION

Figure 3:
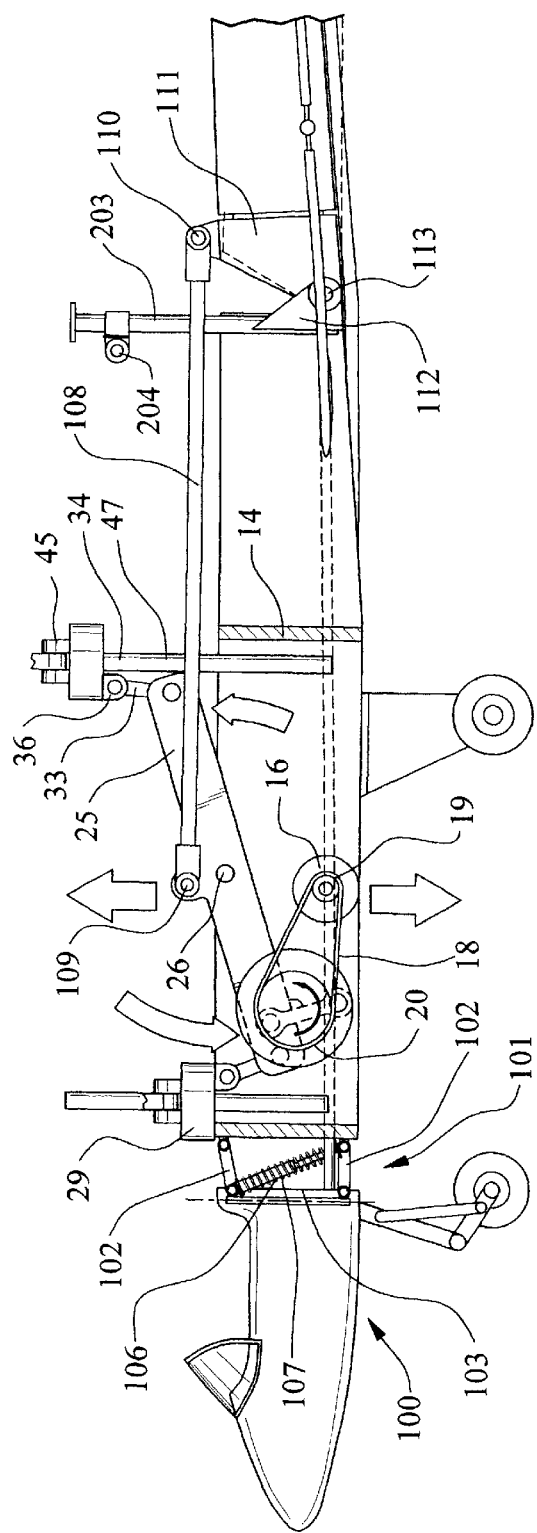
FIG. 3 is a side view, partly in section, showing the vibration damping connection of the cockpit and the damping arm.

The ornithopter 10 has a fuselage 11, wings 12, landing gear 13, and cockpit 100 as shown in FIG. 1. The fuselage 11 has a rigid forward portion 14 and a flexible empennage 15. The fuselage 14 has a central support beam extending along the roll axis to reinforce and rigidify the fuselage section. A passenger compartment 100 and/or a load carrying apparatus is attached to the rigid forward fuselage 14 by an articulating connection 101. The vertical movement of the wings 12 is shown in FIGS. 1B and 1C which illustrates the journals 38 and 39 at the base of the spars 40 and 41. FIGS. 1B and 1C also illustrate the stabilizing links 78 and 79 between the wings and the fuselage. Each link is rotatably attached at one end to the wing spar by a pin 80 and rotatably attached to the fuselage 14 by another pin 81. In this manner, the wing spar may rotate about the attachment and the link may wobble between both pins during the power strokes.

Figure 4:
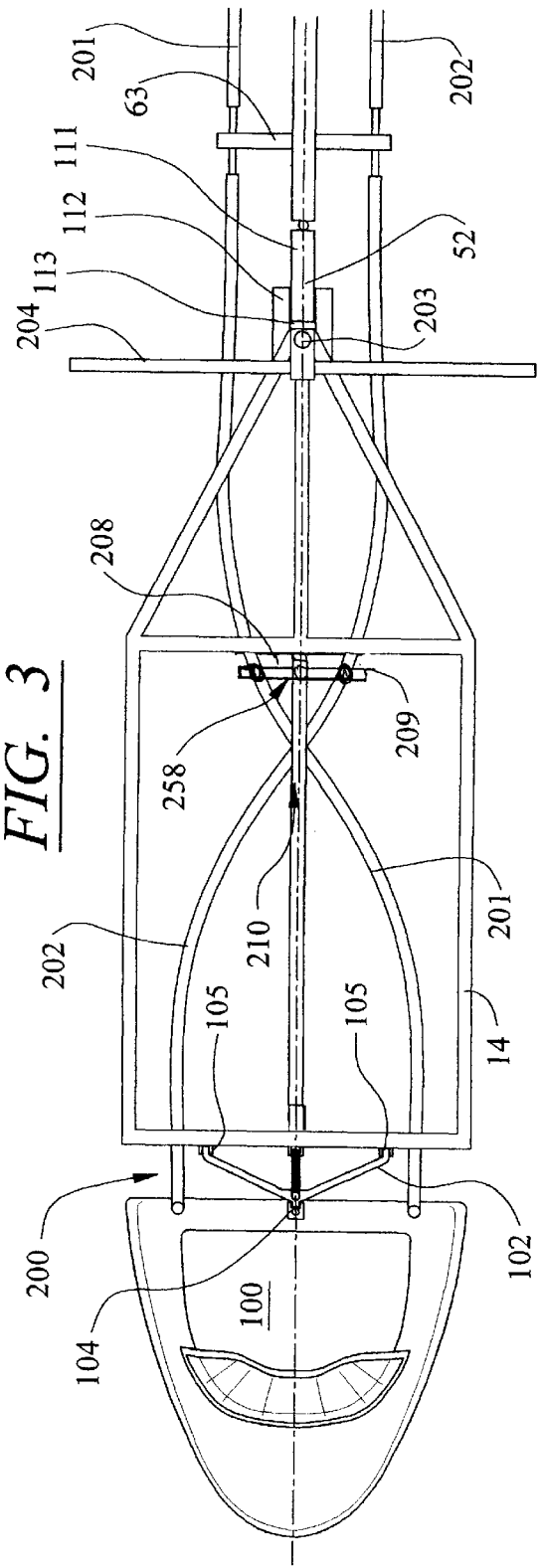
FIG. 4 is a top plan view of the flight controls in the yaw axis.

As shown in FIG. 1A, the flight control system 200 includes the wing warping device 202. A change of direction in the pitch and roll axes is partially controlled by the movement of the foot of the wing. A vertical post 203 is mounted in the fuselage and supports a horizontal bar 204. Control rods 205 and 206 extend from each end of the bar to a respective foot of opposite wings, as shown in FIG. 1A. As shown in FIGS. 3 and 4, the bar 204 has two movements executed by different control inputs. The bar 204 can move along post 203 to change the angle of attack of both wings equally or the bar pivots about a horizontal axis perpendicular to post 203 to simulate the action of ailerons. The wing warping is only shown on one set of wings but it may be on both sets. This wing warping may be integrated with control inputs to the downhaul 76 and vang 77 to further change the shape of the flexible wings 12. The wing warping may be integrated with the lateral movement of the empennage and cockpit through a control stick in the cockpit or it may be a separate control input.

The cockpit or payload compartment 100 is mounted on the fuselage 14 through an articulating joint 101. Extending the cockpit 100 from the fuselage 14 acts as passive dampening of the vertical vibrations by moving a mass further from the center of gravity to increase the inertia of the vehicle. The joint 101 has movement in the pitch and yaw axes of the ornithopter. The movement in the pitch axis serves to passively and actively dampen the vibratory oscillations inherent in the ornithopter as a reaction to the flapping of the wings. As shown in FIG. 3, the cockpit or payload compartment moves vertically parallel to the front of the fuselage 14 by a pair of wishbone shaped pivot arms. The wishbones 102 maintains approximate equal space between the cockpit and the fuselage. A tubular member 103 is vertically attached to the rear of the cockpit. The apexes of the wishbones 102 have pins 104 attached to the tubular member 103 so as to move in opposite response to the vibrations caused by the power stroke and flapping wings. The opposite ends 105 of the wishbone are pivotally attached to the fuselage wall to absorb some of the vertical forces on the wishbone. The tubular member 103 and the aperture 104 also function in the flight control system, to permit the cockpit to pivot in the yaw axis. Of course, this installation could be reversed, with the opposite ends of the wishbone connected to the cockpit and the apex connected to the fuselage. Further, the bar could be replaced with a channel and the wishbone apex could have a pivoting shuttle sliding in the channel.

To further smooth and absorb the vibratory motion of the cockpit, a spring 106 and shock absorber 107 are mounted between the cockpit and fuselage. The ends of the spring and shock absorber are attached to the fuselage and cockpit by a pin and bushing to provide more flexibility. A more sophisticated system (not shown) can include accelerometers input computer controlled to operate the movement of the wishbone and spring mechanism or a hydraulic or electrical powered vibration dampening system.

A power source 16, by way of illustration, as shown in FIGS. 2A, 2B, and 3, is mounted within the fuselage 14. However, the power source may be mounted in other locations on the vehicle. Also, the power source is shown as a generator but any type of motor may be used, including fuel burning reciprocating engines, turbines, fuel cells, batteries or others.

The power source 16 drives a fly wheel 17 through a belt 18 and cooperating pulleys 19 and 20. Of course, the belt could be a chain and the pulleys could be sprockets, as a matter of choice. Also, a drive shaft could be used in place of the belt, with bevel gears, to drive the fly wheel 17.

The fly wheel 17 has an eccentrically mounted pin 21 connected to a drive link 22. Journal 23 permits drive link 22 to rotate around the pin 21 during rotation of the fly wheel. Another journal 24 is in the other end of the drive link 22. Journal 24 rotatably connects the drive link to the power beam 25. This arrangement results in reciprocation of the power beam in response to the rotation of the fly wheel. As an alternative (not shown), the power beam could be reciprocated by solenoids acting on the end(s) of the beam.

The power beam 25 is mounted on the rigid forward fuselage by a pin 26 located intermediate the length of the beam. As the drive link 22 reciprocates, the power beam 25 pivots about pin 26. As can be seen in FIGS. 2A and 2B, the drive link 22 attaches by journal 24 to the power beam 25 nearer one end to provide the reciprocation of the beam. A pin 27 is located on power beam 25 near the journal 24. The pin fits into a rotating journal on connecting link 28. Connecting link 28 rotatably connects power beam 25 and wing mount 29 through journal 30. This link smoothly transfers the reciprocating force of power beam 25 to the front set of wings 31.

The other end of power beam 25 includes pin 32 journaled into rear connecting link 33 for rotational movement. The rear connecting link 33 is rotatably connected to journal 34 on rear wing mount 35 by pin 36. Rear wings are connected to the wing mount 35. As power beam 25 pivots about pin 26, the front set of wings move in one direction while the rear set of wings move in the opposite direction. The opposite movement of the sets of wings counterbalances the reciprocating forces on the fuselage and provides smooth flight. As can be seen by a comparison of FIGS. 2A and 2B, the distance of the throw of the ends of power beam 25 is equal. However, the additional linkage on the front wings dampens the transition of the change of direction of the wings.

Stationary shaft 37 is mounted on the forward fuselage 14 between the forward set of wings and extends vertically normal to the longitudinal axis of the fuselage. The wing mount 29 slidably engages the shaft 37 by a linear bearing and moves along its length during reciprocation of the wings. The wing mount 29 carries journals 38 and 39 which rotatably connect to wing spars 40 and 41 of forward wings 42 and 43.

Rear stationary shaft 44 is mounted on the forward fuselage between the rear set of wings and extends vertically normal to the longitudinal axis of the fuselage. The wing mount 35 slidably engages the shaft 44 and moves along its length during reciprocation of the wings. The wing mount 44 carries journals 45 and 46 which rotatably connect to wing spars 47 and 48 of the rear wings 49 and 50.

The lift force of the forward set of wings supported by pin 27 of beam 25 is counterbalanced by the lift force of the rear wings at pin 32 of beam 25.

Both the rear and front sets of wings have a rotating connections 38, 39, 45 and 46 to the wing mounts 29 and 35, respectively, which also smooth out the reciprocating vibration forces.

In this manner, the pivoting of the power beam 25 drives the wing mounts 29 and 35, in opposite directions, translating the vertical movement to the flapping of the forward wings 42 and 43 with the rear wings 49 and 50.

As shown in FIGS. 1A and 3, the vertical or pitch vibration damping system also provides active damping to the empennage through rigid damping bar 108, shown in FIG. 3, having one end rotatably and eccentrically connected on opposite sides of beam 25. As beam 25 rotates about pin 26, the damping bar moves longitudinally along the roll axis. The aft ends of the damping bar is rotatably connected to a vibration plate ill by pin and bearing 110, shown in FIG. 3. A bracket 112 is attached to the fuselage 14 and extends toward the tail of the craft. The aft end of the bracket has a journal through which a pin 113 extends horizontally. The pin 113 is rotatably connected to the vibration plate 111. The aft edge of the vibration plate is rigidly connected to the empennage 15. This mechanism provides a direct mechanical harmonic movement of the empennage attuned to the vertical power strokes of the wings. The coordinated movement of the cockpit and empennage, in the same plane as the vibration, serves to dampen vehicle vibration and produce a smooth ride.

FIGS. 5, 6A and 6B, illustrate another component of the control system 200. The deflection of the flexible empennage 15 is illustrated as a lateral movement of the free end of the empennage in the yaw axis of the vehicle. In the slow flight regime of the ornithopter, a shift in the center of gravity coupled with asymmetrical increased drag will change the flight path. Longitudinal actuators 201 and 202 are mounted in the fuselage and controlled by crank 258 moving crank arms. As shown in FIG. 4, the longitudinal actuators are crossed at 210 to permit the empennage and payload compartment to simultaneously move to the same side of the yaw axis upon actuation of the crank arms 208 and 209. The actuators may be cable or segmented control rods. For example, as crank arm 209 moves toward the cockpit the empennage will be forced to shorten by actuator 201 while the longitudinal actuator 202 gives slack to the cockpit connection. Simultaneously, the crank arm 208 is shortening actuator 201 to pivot the cockpit. In this manner the payload compartment and the empennage and, therefore, the center of gravity, are shifted to the same side of the yaw axis resulting in a change in flight direction.

The deflection of the flexible longeron 51 is not severe enough to cause permanent bending or structural damage of the empennage. The empennage will tend to return to the longitudinal axis upon relief of the control input. The empennage is made up of a central longeron 51 made of a material with a desired moment of elasticity and strength. The longeron 51 may be in the form of a thin plate with vertical bending zones 57, shown in profile in FIGS. 1A, 2A, 2B and 3. The bending zones may be reduced thickness of the plate or spring biased hinges. The longeron is connected at one end 52 to the rigid fuselage 14 and the free end 53 is connected to the surrounding control elements 201, 202 and 57.

As shown in FIGS. 4, 5, and 6A and B, the control bar or crank 258 has a center pin 260 which forms a rotatable connection. Control input may be applied through the center pin 260 or through the ends of the control bar 258. In the Figures, the bar 258 is rotatably connected at arms 208 and 209 to the longitudinal actuators 201 and 202, respectively, for deflection in the yaw axis. To maintain spatial orientation of the control elements and the longeron 51, a series of brackets 63 are attached along the length of the longeron 51. The brackets have apertures through which the control elements pass.

As can be seen in the drawings, the empennage is hinged at 113 for movement in the pitch axis for active vibration damping and bendable in the yaw axis for flight control.

Figure 7:
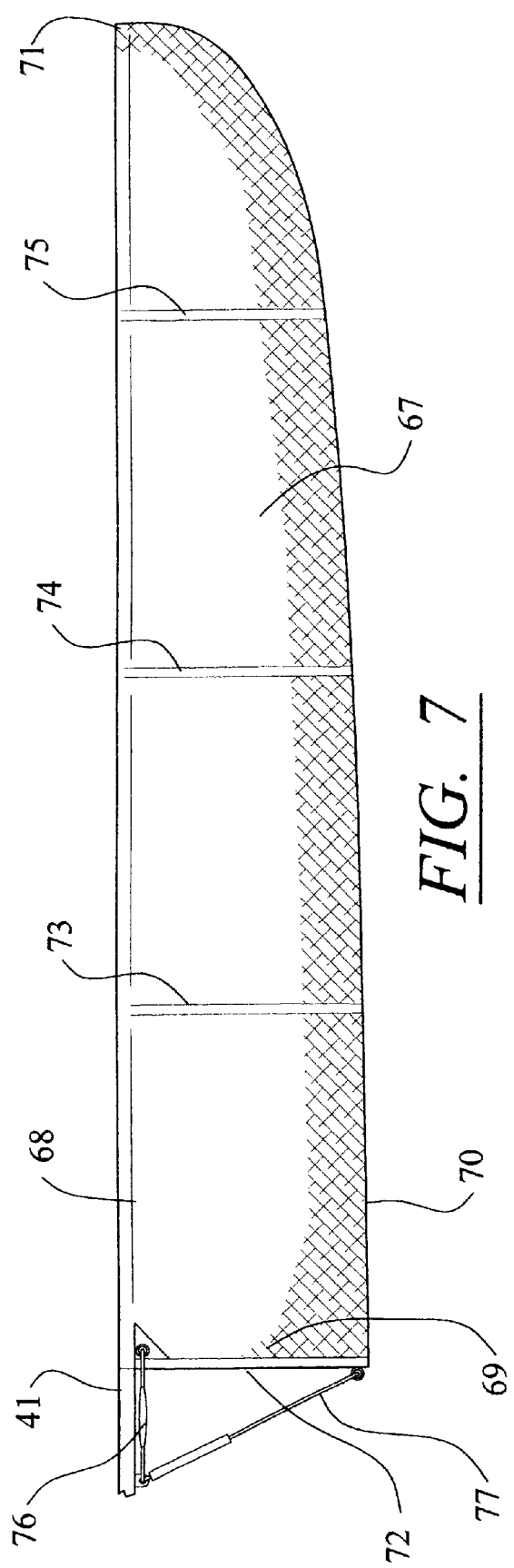
FIG. 7 is a plan view of a wing of the ornithopter.

In order to more closely mimic the efficiency of a bird's wing, the ornithopter has control of the angle of attack and the twist of the wings through each cycle. Each of the wings 12 of the ornithopter 10 has a flexible wing surface 67 in the nature of a sail. The wings surface 67 has a leading edge 68, a foot 69, and a trailing edge 70. The leading edge and the trailing edge intersect at the tip 71 opposite the foot 69. The leading edge of the wing surface is attached to the wing spars of the of the wings 12. As shown in FIG. 7, the wings surface 67 is attached to wing spar 41 of the front set of wings. The foot 69 of the wing surface forms the wing root and includes a batten 72 extending from the leading edge 68 to the trailing edge 70 for stiffening the wing surface material. To provide more shaping to the wing surface, battens 73, 74 and 75 are spaced from the foot to the tip. The battens may be made from any light weight material that has the requisite flexibility and strength to reinforce and hold the desired shape of the wing surface.

To provide adjustability of the chord in the wings a down haul 76 is attached to the foot of the wing surface and extends parallel to the spar. Added tension on the down haul 76 tends to flatten the wing surface longitudinally. Such a control input is related to an increase in the relative wind speed. A vang 77 is attached to the batten 72 near the trailing edge of the wing surface and extends to the spar. By increasing the tension on the vang 77, the chord of the wing is flattened laterally. By attaching the boom van tension to the spar keeps wing warping forces out of the wing drive mechanism. These control inputs could be set before flight or operated by flight controls during flight. In any event, the angle of attack of the wings and the drag may be adjusted by adjusting the twist of the wings.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. An aircraft having a fuselage with opposed movable wings mounted on opposite sides for flight by movement of the opposed wings relative to the fuselage and parallel to the pitch axis, a payload compartment and an empennage, said aircraft comprising a vibration dampening system and a flight control system for stabilized flight, said vibration dampening system including flexible connections on said fuselage, said flexible connections allowing relative movement of said fuselage in the plane of the pitch axis, said flight control system having moveable control actuators in said fuselage connected to said wings and said empennage to change the direction of flight.

2. An aircraft of claim 1 wherein said flexible connections include a pivot arm connecting the fuselage and the payload compartment in the roll axis, said pivot arm having two ends, one of said ends pivotally connected and the other of said ends slidably connected whereby said payload compartmet and said fuselage move relatively in the plane of the pitch axis.

3. An aircraft of claim 2 wherein said pivot bar has a wishbone shape, one of said ends of said pivot bar being the apex of said wishbone.

4. An aircraft of claim 1 wherein said vibration dampening system includes a hinge joint between the fuselage and the empennage, said joint disposed whereby said fuselage and said empennage are relatively movable in the plane of the pitch axis.

5. An aircraft of claim 2 wherein said vibration dampening system includes a hinged joint between the fuselage and the empennage, said joint disposed whereby said fuselage and said empennage are relatively movable in the plane of the pitch axis.

6. An aircraft of claim 1 wherein a power bar is connected to said fuselage and said wings, said power bar reciprocating in the plane of the pitch axis to move said opposed movable wings, said vibration dampening system includes a damping bar extending from said power bar across said joint to said empennage, said damping bar pivotally attached to said power bar and said empennage whereby said empennage is moved in the pitch axis in response to the movement of said power bar.

7. An aircraft of claim 5 wherein a power bar is connected to said fuselage and said wings, said power bar reciprocating in the plane of the pitch axis to move said opposed movable wings, said vibration dampening system includes a damping bar extending from said power bar across said joint to said empennage, said damping bar pivotally attached to said power bar and said empennage whereby said empennage is moved in the pitch axis in response to the movement of said power bar.

8. An aircraft of claim 1 wherein said wings are flexible and have a trailing edge, said flight control system comprises a device for adjusting the shape of said wings whereby the direction of flight is changed.

9. An aircraft of claim 8 wherein said device is mounted in said fuselage, control rods are connected to said device and extend from said device to the foot of said wings, said control rods moving said foot of said wings in the pitch axis to change the angle of attack of said wings.

10. An aircraft of claim 8 wherein said flexible wings have a tip and a root, said flexible wings comprise a spar extending from said tip to said root, a boom having a free end and another end connected to said spar and extending normal thereto forming said foot, a sheet of flexible material having a forward edge, a foot, a chord and a trailing edge extending from said tip to said boom with said forward edge movably connected along said spar and said foot movably connected at said boom, said trailing edge of said material extending from said tip to said free end of said boom, a downhaul connected to said spar and said forward edge to adjust tension along said forward edge, a vang attached to said free end of said boom and said spar to adjust the tension between said boom and said spar, said downhaul and vang connected to said device and adapted to change said chord of said flexible wing.

11. An aircraft of claim 8 wherein said flight control system includes longitudinal actuators connected to said fuselage and said empennage, said actuators extending from said fuselage through said empennage, said actuators movable from a balanced position in which said payload compartment, said fuselage, and said empennage are aligned along the roll axis to an unbalanced position whereby movement of said actuators to an unbalanced position moves said empennage in relation to said fuselage in the yaw axis.

12. An aircraft of claim 2 wherein said flight control system includes longitudinal actuators connected to said fuselage and said payload compartment, said actuators movable from a balanced position in which said payload compartment, said fuselage, and said empennage are aligned along the roll axis to an unbalanced position whereby movement of said actuators to an unbalanced position moves said payload compartment in relation to said fuselage in the yaw axis moving the center of gravity.

13. An aircraft of claim 12 wherein said flight control system includes longitudinal actuators connected to said fuselage and said empennage, said actuators extending from said fuselage through said empennage, said actuators movable from a balanced position to an unbalanced position whereby movement of said actuators to an unbalanced position moves said empennage in relation to said fuselage in the yaw axis.

14. An aircraft of claim 13 wherein said longitudinal actuators connected to said fuselage and said empennage and said longitudinal actuators connected to said payload compartment and said fuselage are disposed to move said empennage and said payload compartment simultaneously relative to said fuselage in the same direction relative to the yaw axis.

15. An ornithopter having a forward set of wings and a rearward set of wings reciprocating in the opposite directions for attaining flight, said ornithopter comprising a fuselage, an articulated payload compartment attached to said fuselage, and an articulated empennage attached to said fuselage, said forward set of wings and said rearward set of wings connected to a power bar pivotally mounted in said fuselage, said ornithopter having a vibration dampening system for damping the forces generated by the reciprocating wings and a flight control system for altering the shape of said ornithopter during flight to change the direction.

* * * * *